INVENTOR
WILLIAM E. JOHNSON

BY W. A. Schaich and Donald K. Wedding
ATTORNEYS

May 19, 1970 W. E. JOHNSON 3,513,327
LOW IMPEDANCE PULSE GENERATOR
Filed Aug. 14, 1968 2 Sheets-Sheet 2

INVENTOR
WILLIAM E. JOHNSON
BY W. A. Schaich and Donald K. Wedding
ATTORNEYS

United States Patent Office 3,513,327

Patented May 19, 1970

3,513,327

LOW IMPEDANCE PULSE GENERATOR

William E. Johnson, Temperance, Mich., assignor to Owens-Illinois, Inc., a corporation of Ohio

Continuation-in-part of application Ser. No. 699,170, Jan. 19, 1968. This application Aug. 14, 1968, Ser. No. 752,626

Int. Cl. H04b *3/32*

U.S. Cl. 307—89 20 Claims

ABSTRACT OF THE DISCLOSURE

An improved pulse generator circuit primarily for multiple discharge gaseous display and/or memory panels having cross-talk eliminating means. A low level voltage signal from an addressing logic system is inductively translated to a high voltage unidirectional pulse and added to a periodic alternating sustaining voltage at selected times to control "on"-"off" states of selected discharge units. The improvements relate to utilization of an electronic switching circuit responsive to a spurious voltage signal to provide a low impedance to voltages induced or capacitively coupled to display lines associated therewith from other conductors. This application is a continuation-in-part of application Ser. No. 699,170 in the name of William E. Johnson and Larry J. Schmersal. Consult the specification for other features and details.

This application is a continuation-in-part of Johnson et al. application Ser. No. 699,170 filed Jan. 19, 1968, portions of which not reproduced herein being incorporated by reference.

The present invention relates in general to a low impedance pulse generator circuit and, in particular, is related to circuits for adding a high voltage unidirectional pulse to a source of sustaining potential at selected time intervals to control operation of selected individual discharge units in a multiple unit discharge gas display and/or memory panel and preventing misfiring or spurious firings of individual discharge units.

The object of this invention is to provide a low impedance pulse generator between a low voltage addressing logic circuitry and a high voltage gaseous display and/or memory device having closely spaced conductors in conductor arrays defining a plurality of gas discharge units in a display panel.

The invention will be described in connection with a gas discharge display panel of the type disclosed in Baker et al., application Ser. No. 686,384 filed Nov. 24, 1967, and entitled "Gas Discharge Display-Memory Device and Method" and the "Interfacing Circuitry and Method for Multiple Discharge Gaseous Display and/or Memory Panels" disclosed in Johnson et al. application Ser. No. 699,170 filed Jan. 19, 1968. However, in a broader sense the invention has utility whenever it is desired to sense spurious pulse voltages.

Multiple discharge display and/or memory panels of the type with which the present invention may be used are characterized by a gaseous medium, usually a mixture of two gases, at a relatively high gas pressure in a thin gas chamber or space between a pair of opposed dielectric charge storage members which are backed by conductor arrays, the conductor arrays backing each dielectric member being transversely oriented to define a plurality of discrete discharge volumes and constitute a discharge unit. In some cases the discharge units may be additionally defined by physical structure such as perforated glass plates and the like. However, in the above-identified patent application of Baker et al., physical barriers and isolation members have been eliminated. In both cases, charges (electrons and ions) produced upon ionization of the gas at a selected discharge unit site or conductor cross-point, when proper alternating operating potentials are applied to selected conductors thereof, are collected upon the surfaces of the dielectric at specifically defined locations and constitute an electrical field opposing the electrical field which created them.

In the interface circuit disclosed in the above-identified patent application of Johnson et al., a low level logic signal, applied at selected times, is used to actuate a transistor switch in series with a direct current voltage source and the primary winding of a transformer. Presence of a logic signal at the input of such transistor renders the transistor conductive and a current surge through the transformer primary induces a high voltage pulse on the secondary. Secondaries of all the transformers are connected in series with a source of sustaining voltage, which, in the absence of voltage pulses induced by transformer action are insufficient to control a selected discharge unit, but is sufficient to sustain a sequence of discharges once the selected discharge unit has been fired or discharged, such being effected by a stored wall charges as described in greater detail in said Baker et al. application. Due to the small spacing (about 30 mil conductor center to conductor center) between conductors of conductor arrays defining the discharge units, energy from large pulse voltages applied to a selected conductor may be capacitively coupled to adjacent conductors and can cause cross-talk and/or spurious signals to discharge units.

The present invention is directed to a pulse generator incorporating a solution to the problem of cross-talk or spurious pulsing of discharge units in a plasma display panel and includes a circuit responsive to spurious voltage pulses to provide a low impedance to spurious currents in conductors in such arrays in such a way as to absorb or dissipate pulse energy capacitively coupled to certain conductors and hence suppress cross-talk or avoid spurious firing or turning off of selected discharge units. Specifically, spurious voltages are sensed by a diode sensor which controls a transistor circuit to produce a low impedance to spurious currents.

The above and other advantages and features of the invention will be better understood when considered with the following specification and accompanying drawings wherein.

Figure 1A:
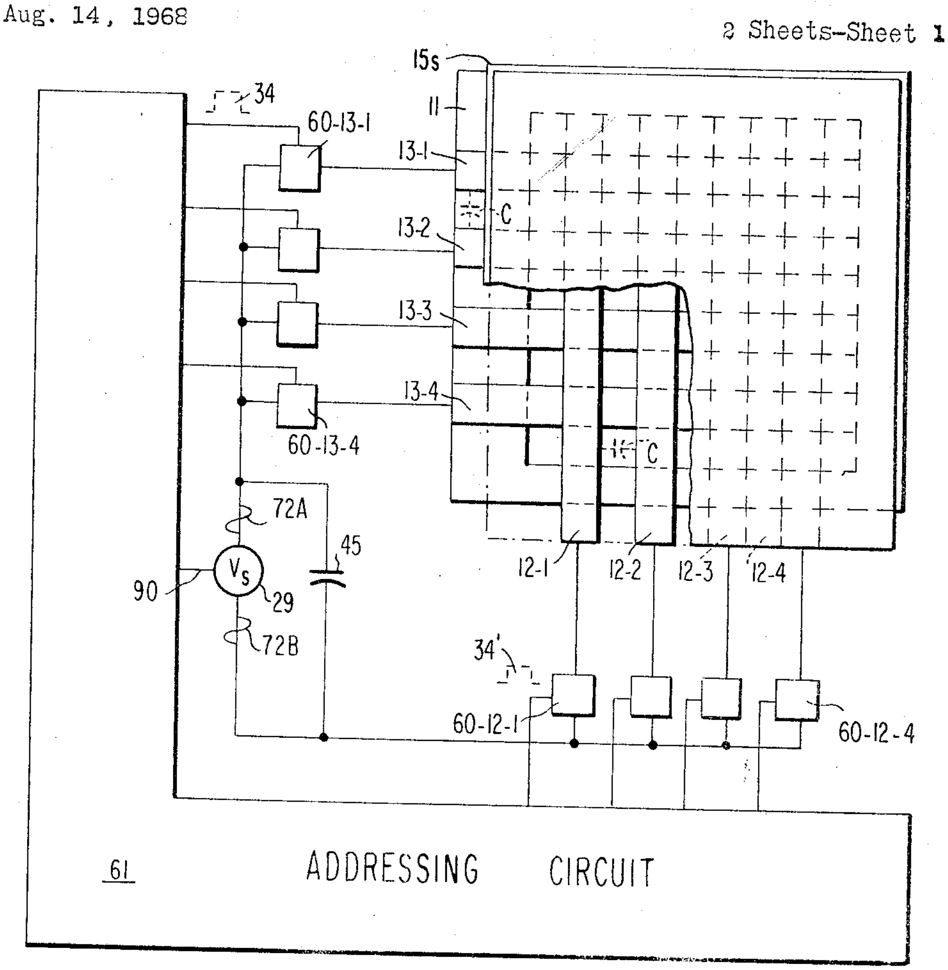
FIGS. 1A and 1B are diagrammatic illustrations of a gas discharge panel and associated circuits for carrying out the invention and are the same as FIGS. 1A and 1B of application Ser. No. 699,170.
Figure 1B:
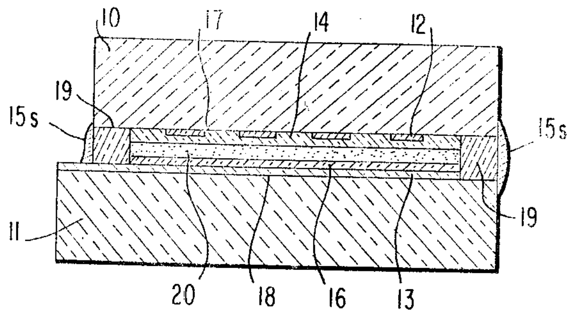

With reference now to the drawings, FIGS. 1A and 1B (both being taken from application Ser. No. 699,170 filed Jan. 19, 1968) illustrate a gas discharge display/memory panel disclosed in the above-identified Baker et al. application, in which glass support members 10 and 11 have formed on their opposing surfaces conductor arrays 12 and 13 respectively. Dielectric members or coatings 14 and 16 have surfaces 17 and 18 respectively, which form charge storage surfaces for storage of charges (electrons and ions) generated upon discharge (ionization) of individual discharge units, respectively.

The surfaces 17 and 18 of dielectric members 14 and 16 respectively, are spaced apart by spacer 19 to form a thin gas chamber or space 20 and spacer 19 or an additional sealant 15S may be utilized to form a complete hermetic seal for the gas chamber 20. Glass support members are sufficiently rugged to withstand the pressure of the gas within space 20 and ambient pressure and with a minimum deflection. In the disclosed panel there are no physical obstructions or structures in the gas chamber and due to the pressure, a plurality of discrete discharges can occur within chamber 20 without detrimental interaction to the display or memory functions of individual discharge units, even though the conductors 12–1, 12–2, 12–N and 13–1, 13–2 . . . 13–N of the conductor arrays are spaced no more than about 30 mils center-to-center spacing. It is to be understood that the invention may be applied with equal facility and results to display/memory panels of the type where perforated plates, honeycombs or other physical structures are utilized to provide physical confinement for each individual discharge unit.

The gas may be conditioned (e.g., provided with a supply of free electrons) for the ionization process by application of an initial firing potential to a selected pair of conductors for sufficient time to effect an initial discharge in a discrete gas volume, as for example a discharge at the discharge unit consisting of the crossing or shadow area of conductors 12–1 and 13–1, the dielectric on those conductors at those crossings or shadow areas and the discrete volume of gas therebetween, the volume of gas permitting photonic communication between all discharge units to that photons which strike or impact the dielectric surfaces produce or cause the release of electrons. Alternatively, the gas may be conditioned by providing an exterior source of ultraviolet radiation for producing by photoelectric emission free electrons for the ionization process or by placing a radioactive material in the glass or gas space which likewise can effect the presence of sufficient free electrons within the gas space for ionization at uniform potentials for a given gas, pressure, panel configuration, etc. At any rate, the invention will be described further in connection with a gas volume (whether unconfined as in the above referenced Baker et al. application or confined by a honeycomb or cellular structure as in the prior art) that has been conditioned for the ionization process.

Individual discharge units may be turned "on" (a sequence of momentary discharges on alternate half cycles of applied alternating potential following an initial discharge) and "off" (termination of the sequence) by many different wave forms, the simplest of which is the sinusoidal voltage wave form. Basically, the only condition other than the voltage wave form is that the discharge be conditioned such that it is responsive to the applied voltage.

Figures 2, 3:
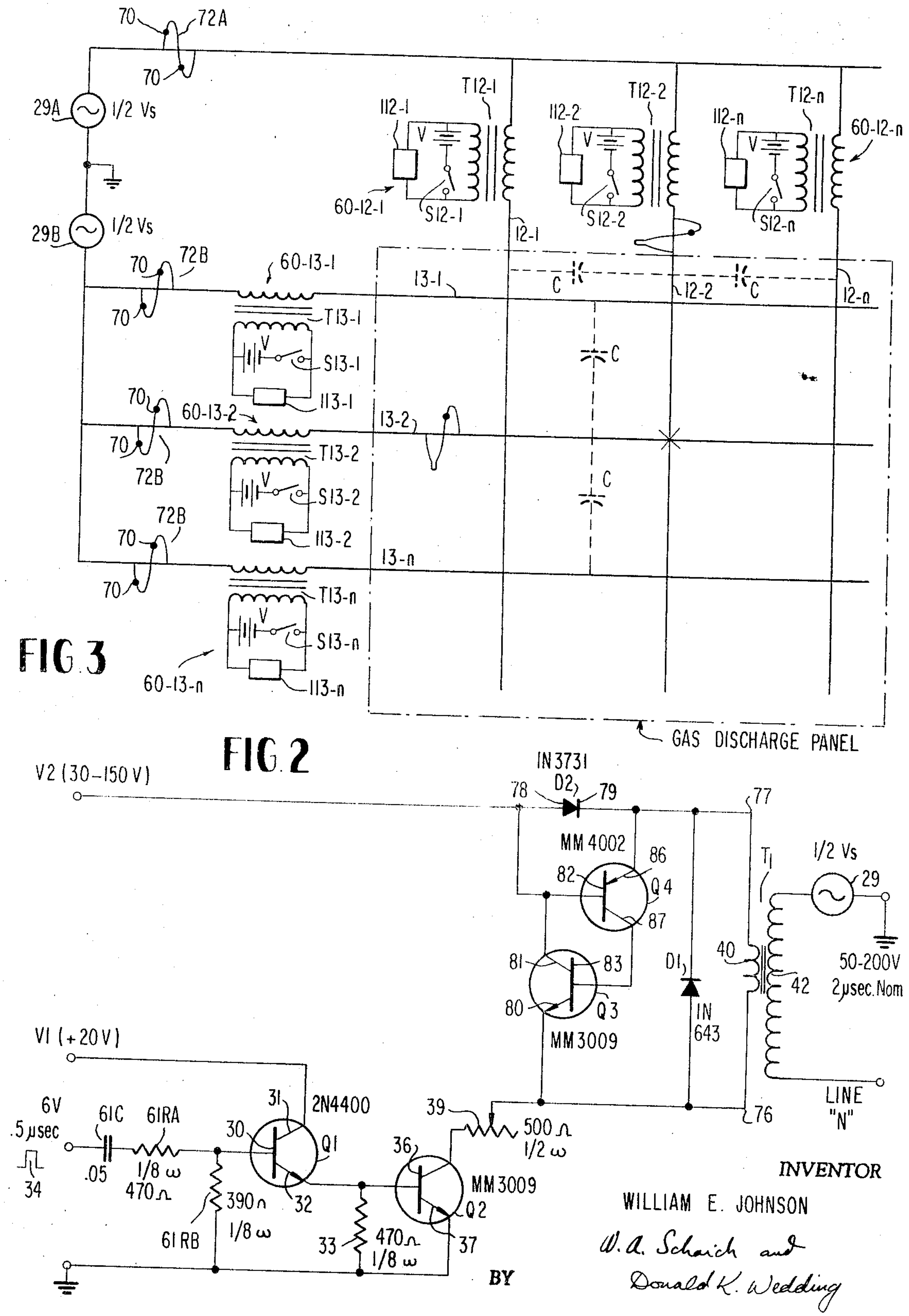
FIG. 2 is an electrical schematic of a form of pulse generating circuit incorporating the invention.
FIG. 3 is a diagram used to explain the principle of the invention as applied to a gas discharge display panel.

The pulse generator circuit for addressing a conductor of an individual discharge unit is disclosed in FIG. 2 and includes a first transistor Q1 having base 30, collector 31 and emitter 32 electrodes with collector electrode 31 connected directly to a direct current supply V1 and the emitter electrode 32 connected to ground through resistance 33. An input logic signal 34 (about 4 volts having a duration of about 100 nanoseconds) is applied to base electrode 30. This transistor Q1 operates as an amplifier and its output is coupled from emitter 32 directly to base electrode 36 of a second transistor Q2. The emitter electrode 37 of transistor Q2 is connected directly to ground and collector electrode 38 is connected through a small series resistor 39 to primary winding 40 of a transformer T1. The upper end of the primary winding of transformer T1 is connected to relatively high direct current voltage V2 through diode D2 and a diode D1 is connected in shunt or parallel with the primary winding 40 of transformer T1.

When a logic pulse 34 from addressing logic circuit 61 is applied through coupling capacitor 61C and voltage divider resistors 61RA and 61RB to the base 30 of emitter-follower transistor Q1, this transistor increases the power level sufficiently to turn on transistor Q2 in a switching mode. This switching action is rapid so that a current surge flows through the primary winding 40 of transformer T1 causing a voltage pulse to be produced on the secondary winding 42. At the end of the input pulse 34, transistor Q2 will turn off stopping the current flow in the primary winding 40 of transformer T1 and a second voltage pulse on the secondary 42 of the transformer is prevented by the diode D1. The diode D1 clips the negative part of the oscillation giving it single half wave output pulse. This diode D1 also serves to protect the transistor Q2 from large transients which may occur during the turn "off" operation. As a practical matter, the input logic pulse 34 is made to have a duration less than half the period to take into account the transistor stored charge which may delay the turning off time of the transistor after the input signal is removed. Addressing logic circuit 61 while complex is conventional and may be of the line scan type or random access type, either of which can supply logic pulses 34 at selected time intervals.

The secondary winding 42 of the transformer T1 is in series circuit with the sustaining signal generator 29 and the line (conductor of the conductor array) being addressed so that the two voltages are added. In order to minimize interaction, the resonant frequency of the sustaining generator and the resonant frequency of the pulse generator are preferably made different so as to reduce power drain and provide maximum signal for application to the panel. The "on"-"off" pulse is adjusted for about a one microsecond duration and the sustaining signal period is about ten microseconds, however, the circuit is not limited to these particular time ratios.

The display panel requires a continuous signal applied to all lines, which is referred to as the sustaining signal or voltage. By continuous signal it is meant that the voltage be periodic so that it may be of the simple sinusoidal type or a complex wave shape applied for short time intervals and repeated periodically. The same sustaining voltage is applied to all X lines and a similar voltage is applied to all Y lines but at a 180° phase relationship. These voltages, as applied to conductors of conductor arrays on the panel, are balanced with respect to ground to permit the addressing of a single discharge unit within the panel.

In order to lessen the effect of variable capacitive loading on the sustaining voltage generator 29, a capacitance 45 may be connected in shunt with the panel, the larger the panel capacitance change as more discharge units are turned "on," being accommodated by a larger shunt capacitance.

As shown in FIG. 1A, each line on conductor of a conductor aray is provided with a pulse generator 60 (e.g., 60–12–1 . . . **60–12–*n* and 60–13–1 . . . 60–13–*n*) which receives a trigger input (logic pulse 34) from addressing circuit 61. For example, when it is desired to address or turn "on" the discharge unit defined by the crossing of conductors 13–1 and 12–1, a logic pulse is applied simultaneously to pulse generator circuit 60–13–1 and 60–12–1 so that unidirectional pulses are added to the out of phase voltages, repectively, from sustaining voltage generator 29. A synchronization connection 90 between sustaining generator 29 and addressing logic circuit 61 is provided so that the logic pulses 34 occur at proper times with respect to the sustaining voltage from sustaining voltage generator 29**.

If a sinusoidal voltage on a discharge unit is raised in magnitude to the breakdown level (the firing potential) the discharge unit will discharge. If the amplitude of the applied potential is reduced, the discharge unit will continue to stay on and, in fact, the discharge unitl will stay on down to some minimum level of sustaining voltage at which point the discharge unit will go off so that if the applied alternating potential voltage is less than the breakdown or firing voltage but greater than the sustaining voltage level the discharge unit will continue to be in a single firing state. This difference between "on" and "off" voltage levels is utilized as an electrical memory and, as noted above, it is due to alternate storage of charges on the surfaces 17 and 18 of dielectric members 14 and 16 to constitute a discharge unit bias or memory voltage. When the discharge units are arrayed in horizontal rows and vertical columns served by horizontal and vertical conductor arrays it is important to be able to alter the state of one discharge unit while not affecting the status of others. Moreover, for simplicity purposes, it is desirable to utilize a sinusoidal signal that is at or slightly greater than the sustaining level and to utilize additive voltages on certain conductors to modify the status of selected discharge units.

In order to turn "off" a selected discharge unit (e.g., terminate a sequence of discharges representing the "on" state), the stored charges (which constitute a discharge unit bias voltage) must be eliminated or modified in such a way that the amplitude of applied voltage, which is the constant amplitude sustaining voltages 72A and 72B (see FIG. 3), will be insufficient to effect a discharge. The turn "off" pulse is identical to the turn on pulse and it has been found that the time of application of the turn "off" pulse with respect to the sustaining voltage can effect a turn "off" of a discharge unit if it is applied (1) in synchronism in time such that the pulse top or peak occurs at the point of a normal discharge, e.g., point 70 (see FIG. 3), or (2) to modify the slope of the next to last discharge, or (3) by having the slopes of the pulse and applied sinusoidal voltages combined to produce a near zero slope condition at the point of the last discharge.

Thus, whenever a firing voltage (or a discharge terminating voltage) is induced in a transformer secondary 42 in additive relation to the sustaining signal generator voltage to fire a selected discharge unit, such high voltage is applied to the selected conductor pair of arrays 12 and 13 at a selected discharge unit. Adjacent conductors will not have the high voltage applied exactly thereto and may, through capacitive coupling, receive an increase voltage of sufficient magnitude as to effect a spurious firing of unselected discharge units.

Except for diode D2, the circuit of FIG. 2 as thus far described is essentially disclosed in the above mentioned Johnson et al. application Ser. No. 699,170. The circuit of the present invention includes diode D2 and a switching transistor means comprising transistor Q3 and transistor Q4 which circuit is operative to sense voltages induced in primary winding 40 from secondary winding 42. Diode D2 has its anode 78 connected to the positive terminal of direct current V2 and its cathode 79 is connected to upper end 77 of primary winding 40. Emitter 86 of transistor Q4 is connected to cathode 79 of diode D2 while base electrode 82 of transistor Q4 is connected directly to anode 78 of diode D2. Collector electrode 87 of transistor Q4 is connected directly to base electrode 83 of transistor Q3 and collector electrode 81 of transistor Q3 is directly connected to base electrode 82 of transistor Q4. It will be recognized that this connection of transistors Q3 and Q4 is essentially a PNPN device and that for opposite polarity operation transistor Q4 may be an NPN type transistor, transistor Q3 may be a PNP type transistor and the direction of diodes D1 and D2 would be reversed.

Voltages induced in primary winding 40 from secondary winding 42 which cause the upper end 77 of winding 40 to be negative with respect to the lower end 76 find a low impedance path through shunt diode D1 and this low impedance is reflected to the primary as a low impedance.

Voltages induced in primary winding 40 which appear as positive potentials at the upper end 77 of this winding tend to reverse bias diode D1 which then appears as a high impedance to such voltages. However, diode D2 is likewise reverse biased by such voltage so this positive voltage appears as a potential difference across diode D2 and this voltage is applied to the emitter 86-base 82 circuit of transistor Q4 and forward biases transistor Q4 to conduction. Collector 87 of transistor Q4 could be connected to the lower end 76 of primary winding 40 to provide a low impedance shunt circuit on primary winding 40. However, for purposes of efficiency and peak power capability transistor Q3 is utilized with transistor Q4 as a PNPN device. Thus, collector 81 of transistor Q3 is directly connected to the base 82 of transistor Q4 and collector 87 of transistor Q4 is directly connected to base 83 of transistor Q3 and emitter 80 of transistor Q3 is connected directly to end 76 of primary winding 40. With this circuit, positive potentials induced in primary winding 40 are sensed across diode D2 (as well as across diode D1) which detects currents attempting to flow in the reverse direction. Reverse voltage appearing across diode D2 also appear at the emitter 86-base 82 circuit of transistor Q4 to immediately render both transistors Q3 and Q4 heavily conductive because of the PNPN connections described above. The conductive condition of the transistor pair is, in effect, a very low impedance on primary winding 40 which is reflected to secondary winding 42. The result is that with respect to voltages or currents applied to or at secondary 42, which induce voltages in primary 40, see a very low impedance and hence there is a low voltage drop across the secondary.

The usefulness of this circuit in connection with a gas discharge panel of the types referred to above is illustrated in FIG. 3. In FIG. 3 a gas discharge panel shown as a dotted rectangle and has conductor arrays 12 and 13, cross-points of conductors 12 with conductors 13 locating and defining a particular discharge unit in the panel. The sustaining voltage sources are shown as 29A and 29B which are 180° out of phase and apply their respective voltages to conductors 12–1, 12–2 . . . **12–*n* and conductors 13–1, 13–2 . . . 31–*n*, respectively, through the secondary windings of transformers T12–1, T12–2 . . . T12–*n* and T13–1, T13–2 . . . T13–*n*, respectively, each of which corresponds to secondary winding 42 shown in FIG. 3. Each switches S12–1, S12–2 . . . S12–*n* and S13–1, S13–2 . . . S13–*n* correspond to switching transistor Q2 (FIG. 2) and are selectively operated in accordance with logic pulses 34 from addressing circuit 61, one of switches S13–1, S13–12 and of switches S12–1, S12–2 . . . S12–*n*** being actuated simultaneously to locate and electrically manipulate a selected discharge unit or cross-point. Batteries labeled V correspond to direct current source V2 (FIG. 2) it being understood that a single source of direct current is utilized, separate batteries being shown for purposes of explanation.

A momentary closing of any switch causes a current surge through the primary winding of the associated transformer which current surge induces a high voltage pulse in the secondary winding of the associated transformer which is added to the sustaining voltage $V_s/2$ for the conductor being driven. Suppose it is desired to manipulate the discharge unit marked X which is defined or located at the crossing point of conductor 12–2 and 13–2. Momentarily, switch S12–2 is closed and simultaneously switch S13–2 is closed, both switch closings being effected by addressing circuit 61. Current surges through the primaries of transformers T12–2 and T13–2 induce voltage pulses in their secondaries which are added to the sustaining voltages to fire or control the discharge at point X, as described in said Johnson et al. application. Because of the closeness of conductors 12–1 and **12–*n* to conductor 12–2 and the closeness of conductors 13–1 and 13–*n* to conductor 13–2 spurious voltage pulses may be coupled to these adjacent conductors as well as others by the distributed capacitances C between the conductors. In order to assure that such spurious voltage pulses do not effect undesired manipulation of discharge units along the adjacent conductors, each pulse circuit 60–13–1, 60–13–2 . . . 60–13–*n* and 60–12–1, 60–12–2 . . . 60–12–*n* includes means for reducing the impedance thereof in response to the presence of spurious voltages. Sensing and switching circuits 112–1, 112–2 . . . 112–*n* and sensing and switching circuits 113–1, 113–2 . . . 13–*n*** sense voltages induced in primary windings of transformers T12–1, T12–2 . . . T12–*n* and T13–1, T13–2 . . . T13–*n*, respectively, and effect a switching or shunting action to such induced voltages and appear as low impedances thereto, which low impedances are reflected into the transformer secondaries. In this way, any voltage coupled to an adjacent conductor produces only a low voltage drop at each secondary winding which is of insufficient magnitude even when added to the sustaining voltage at a given conductor to effect a discharge or control at an unselected discharge unit. Sensing and switching circuits 112 and 113, as shown in FIG. 3, include diodes D1 and D2 and transistors Q3 and Q4.

In addition to providing a low impedance for spurious pulse voltages, the circuit is also effective in reducing the transformer impedance with respect to the currents due to sustaining voltages $V_s/2$.

While the invention has been described in connection with a gas discharge panel, it may be used in other situations when it is desired to produce a low impedance effect to voltage pulses or signals.

In FIG. 2, typical components values, transistor and diode types are exemplary for voltage values shown.

The invention is not to be limited to the precise form shown in the drawings for obviously many changes may be made, some of which are suggested herein, within the scope of the following claims.

What is claimed is

1. The method of minimizing the effect of spurious voltage pulses on an adjacent conductor in a gas discharge display panel having at least one conductor array, each conductor of the array being supplied from a pulse generator connected thereto, and wherein pulse supplied to one conductor to control the discharge of said array to a selected discharge unit in said panel may be coupled to an adjacent conductor in the array to constitute said spurious voltage pulse on said adjacent conductor, comprising, reducing the impedance of the pulse generator of said adjacent conductor to spurious voltages at said pulse generator for said adjacent conductor.

2. The invention defined in claim 1, wherein said pulse generator includes a pulse transformer with the secondary of said pulse transformer being connected to a conductor of said conductor array and said impedance of said pulse generator is reduced by producing an electrical short circuit on the primary winding of the pulse transformer.

3. A spurious voltage detection circuit comprising, in combination a spurious voltage sensing diode connected in series circuit with a source of spurious voltage, transistor means connected to said diode and responsive to appearance on said diode of a spurious voltage having a voltage polarity opposite the forward conduction condition of said diode, said transistor means being rendered conductive on appearance of a spurious voltage at said diode to provide a low impedance return path to said source of spurious voltage.

4. The invention defined in claim 3, including a further diode connected in shunt with said source of spurious voltage, said further diode being connected so as to exhibit a low impedance to spurious voltages of a polarity opposite the polarity of spurious voltage having the polarity opposite the forward conduction condition of said first mentioned diode.

5. The invention defined in claim 4, wherein said transistor means comprises a complementary transistor pair, the emitter-base circuit of a first transistor of said transistor pair being connected across the first of said diodes, the base-collector circuits of said transistor pair being connected base of first transistor to collector of second transistor and vice versa and the emitter circuit of the other transistor of said pair being connected to said source of spurious voltage opposite the end connected to the first said diode.

6. The invention defined in claim 4, wherein said transistor means comprises a transistor pair and wherein, the emitter-base circuit of a first transistor of said transistor pair is connected across the first of said diodes, the base-collector circuits of said transistor pair is connected base of first transistor to collector of second transistor and vice versa, and the emitter of the other transistor of said pair is connected to said source of spurious voltage opposite the end connected to the first said diode.

7. In a pulse generator circuit having a transformer primary connected in series circuit with a source of direct current and switch means selectively operated to cause current surges through said primary winding and resulting high voltage pulses in the secondary winding of said transformer, and wherein said secondary winding is connected to a load, the improvement which comprises, means for reducing the impedance of said secondary winding during a time when said switch means is not operated.

8. The invention defined in claim 7, wherein said means for reducing the impedance of said secondary winding comprises, sensing means for sensing voltages induced in said primary winding from said secondary winding, and means connected in shunt with said primary winding and operated by said sensing means upon said sensing means sensing voltage induced in said primary winding from said secondary winding.

9. The invention defined in claim 8, wherein said sensing means is a diode connected in its low impedance direction with respect to the polarity of said source of direct current.

10. The invention defined in claim 7, wherein said means for reducing the impedance of said secondary winding include a diode connected in shunt with said primary winding.

11. The invention defined in claim 9, wherein said means operated by sensing means includes a transistor pair, the emitter-base circuit of a first transistor of said transistor pair is connected across said diode, the base-collector circuits of said transistor pair is connected base of first transistor to collector of second transistor and vice versa, and the emitter of the other transistor of said pair is connected to an end of said primary winding, whereby said transistor pair is rendered conductive on said sensing means sensing a voltage induced in said primary winding from said secondary winding to provide a low impedance circuit across said primary winding.

12. In a gas discharge panel of the type in which a discharge in a hermetically enclosed ionizable gas generates charges alternately collectable on a pair of discrete areas of a pair of means having dielectric surfaces, said dielectric surfaces being backed by conductor arrays, respectively, defining a plurality of pairs of opposed discrete charge storage areas and means supplying a periodic alternating sustaining voltage connected to said conductors, an addressing circuit for selecting individual ones of said plurality of conductors, means controlled by said addressing circuit for producing high voltage unidirectional pulses having a time duration relatively short with respect to a cycle of said periodic alternating sustaining voltage, and means for selectively adding said high voltage unidirectional pulses to said periodic alternating sustaining voltage applied to a selected conductor pair of said conductor arrays to fire the selected gas discharge unit and to terminate the firing of said selected discharge unit, the improvement which comprises, switch means responsive to a spurious pulse voltage for reducing the impedance of said means for producing high voltage unidirectional pulses to spurious pulse currents.

13. The invention defined in claim 12, wherein said means controlled by said addressing circuit includes, a source of direct current, a normally open further switch, an induction device connected in series circuit with said switch and said source of direct current, means for operating said further switch in accordance with a signal from said addressing circuit to cause a current surge to flow through said induction device and produce said high voltage unidirectional pulses, said switch means being connected in electrical shunt with said induction device.

14. The invention defined in claim 13, wherein said induction device is a transformer having a primary and a secondary winding, said primary winding being connected in series with said source, said secondary winding being connected in series with said source of periodic alternating sustaining voltage, diode means connected to said primary winding to suppress ringing currents, said switch means is connected in shunt with said primary winding and said diode means.

15. The invention defined in claim 14, wherein said switch means includes a spurious pulse sensing diode, a first transistor, and a nonconducting transistor means, said nonconducting transistor means being connected in shunt with said primary winding and connected to receive an input from said sensing diode to be rendered conductive thereby.

16. In a multiple gas discharge panel of the type in which a discharge in a hermetically enclosed gas generates opposite polarity charges alternately collectable on a pair of spaced opposed discrete dielectric areas of spaced dielectric surface means bounding a gas discharge medium, each said dielectric surface means being constituted by a thin dielectric coating on conductor arrays defining a plurality of pairs of opposed discrete charge storage areas, means commonly supplying a periodic alternating sustaining voltage to all said conductors, and capable of sustaining discharge between said pairs of opposed discrete areas following and initial discharge in the gas between said areas, means for initiating said initial discharge comprising a source of direct current, a normally open switch and an induction device, and means connecting said source of direct current, said normally open switch and said induction device in a series circuit, means selectively operating said switch to cause a current surge from said source of direct current to flow through said induction device and produce a high voltage unidirectional voltage pulse which is added to said periodic alternating sustaining voltage, the improvement which comprises, a further switch means shunting said induction device out of said series circuit and responsive to operation of said switch means to insert said induction means in said series circuit.

17. The invention defined in claim 16, wherein said normally open switch includes a first switching transistor, and wherein said further switch means includes a shunt switching transistor means, and means controlling the conduction condition of said shunt switching transistor means alternately with the conduction condition of said first switching transistor.

18. The invention defined in claim 17, wherein said means for controlling the conduction condition of said shunt switching transistor means includes a sensing diode connected to sense voltages induced in said induction device.

19. A pulsing circuit for supplying electrical pulses to one conductor of an array of closely spaced conductors, there being a pulsing circuit for each conductor of the array, said pulsing circuit including a pulse transformer having primary and secondary windings, said secondary winding being connected to said one conductor of said array to supply thereto a voltage pulse induced therein, and said primary winding having means connected thereto for causing a current surge to flow therethrough and induce said voltage pulse in said secondary winding, the improvement comprising, a shunt switching transistor means connected in shunt with said primary winding and, means connected to said shunt switching transistor for rendering said shunt switching transistor conductive upon a voltage being induced in said primary winding from said secondary winding.

20. The invention defined in claim 19, wherein said means connected to said shunt switching transistor means includes a sensing diode for sensing operation of said means for causing a current surge through said primary winding and operable in response thereto for rendering said switching transistor nonconductive.

References Cited

UNITED STATES PATENTS

| | | | |
|---|---|---|---|
| 2,832,900 | 4/1958 | Ford | 307—313 X |
| 3,048,718 | 8/1962 | Starzec et al. | |
| 3,192,441 | 6/1965 | Wright | 317—49 X |
| 3,334,185 | 8/1967 | Marlot | 307—93 X |
| 3,343,129 | 9/1967 | Schmitz | 340—166 |
| 3,383,663 | 5/1968 | David | 340—166 |

ROBERT K. SCHAEFER, Primary Examiner

T. B. JOIKE, Assistant Examiner

U.S. Cl. X.R.

307—93, 106; 317—50; 340—166